US011727332B2

(12) United States Patent
Graham et al.

(10) Patent No.: US 11,727,332 B2
(45) Date of Patent: Aug. 15, 2023

(54) LONG TERM SCHEDULING OF TASK RESOURCES AT A PLURALITY OF RETAIL STORES

(71) Applicant: Walmart Apollo, LLC, Bentonville, AR (US)

(72) Inventors: Rory J. Graham, Bentonville, AR (US); Everett R. Campbell, Bentonville, AR (US); Brandon L. Gardner, Bentonville, AR (US); Lara N. Shock, Bentonville, AR (US); Craig W. J. Hamilton, Centerton, AR (US); Othman Boudhoum, Centerton, AR (US); Adohree Teague, Frisco, TX (US); Kurt W. R. Bessel, Mexico, NY (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/512,595

(22) Filed: Oct. 27, 2021

(65) Prior Publication Data

US 2022/0051158 A1 Feb. 17, 2022

Related U.S. Application Data

(63) Continuation of application No. 16/565,945, filed on Sep. 10, 2019, now abandoned.

(Continued)

(51) Int. Cl.

| | |
|---|---|
| ***G06Q 10/0631*** | (2023.01) |
| ***G06Q 10/1093*** | (2023.01) |

(52) U.S. Cl.

CPC ................ *G06Q 10/06316* (2013.01); *G06Q 10/063114* (2013.01); *G06Q 10/063116* (2013.01); *G06Q 10/1097* (2013.01)

(58) Field of Classification Search

None

See application file for complete search history.

(56) References Cited

U.S. PATENT DOCUMENTS

| | | | |
|---|---|---|---|
| 5,111,391 | A | 5/1992 | Fields |
| 6,823,315 | B1 | 11/2004 | Bucci |

(Continued)

OTHER PUBLICATIONS

Anna et al (Task-resource Scheduling Problem), Aug. 2012, International Journal of Automation and Computing, (Year: 2012).*

(Continued)

*Primary Examiner* — Romain Jeanty

(74) *Attorney, Agent, or Firm* — Fitch, Even, Tabin & Flannery LLP

(57) ABSTRACT

In some embodiments, apparatuses and methods provide long term scheduling at a plurality of retail stores including storing a forecasted data over at least eight weekly scheduling periods; determining based on the forecasted data a first baseline hours demand value for each day of a week for each job function of a first set of job functions at a particular retail store; determining based on the forecasted data a second baseline hours demand value for each day of the week for each job function of a second set of job functions at the particular retail store; based on the first and second baseline hours demand values, automatically generating a plurality of fixed schedules for a set of task resources at each of the plurality of retail stores; accessing a first fixed schedule associated with the first task resource; and displaying the first fixed schedule.

20 Claims, 8 Drawing Sheets

Related U.S. Application Data

(60) Provisional application No. 62/734,847, filed on Sep. 21, 2018.

(56) References Cited

U.S. PATENT DOCUMENTS

| | | | | |
|---|---|---|---|---|
| 7,155,400 | B1 * | 12/2006 | Jilk | G06Q 10/06316 705/7.41 |
| 7,386,465 | B1 | 6/2008 | Friedland | |
| 7,672,746 | B1 | 3/2010 | Hamilton | |
| 8,224,472 | B1 * | 7/2012 | Maluf | G06Q 10/06312 705/7.17 |
| 8,290,804 | B2 | 10/2012 | Gong | |
| 8,893,130 | B2 * | 11/2014 | Smith | G06Q 10/06 718/102 |
| 10,762,455 | B1 | 9/2020 | Sager | |
| 10,832,185 | B1 | 11/2020 | Bricklin | |
| 2004/0267591 | A1 | 12/2004 | Hedlund | |
| 2007/0288287 | A1 * | 12/2007 | Hayler | G06Q 10/06311 705/7.14 |
| 2008/0146334 | A1 | 6/2008 | Kil | |
| 2010/0049574 | A1 * | 2/2010 | Paul | G06Q 10/063112 705/7.14 |
| 2010/0161492 | A1 | 6/2010 | Harvey | |
| 2011/0145032 | A1 | 6/2011 | Stearns | |
| 2013/0054289 | A1 | 2/2013 | Sengupta | |
| 2013/0090968 | A1 | 4/2013 | Borza | |
| 2014/0039962 | A1 | 2/2014 | Nudd | |
| 2014/0136255 | A1 * | 5/2014 | Grabovski | G06Q 10/063114 705/7.14 |
| 2014/0320265 | A1 * | 10/2014 | Jones | G06Q 10/087 340/10.1 |
| 2015/0135183 | A1 * | 5/2015 | Kipp | G06F 9/5038 718/103 |
| 2016/0292011 | A1 | 10/2016 | Colson | |
| 2020/0097878 | A1 | 3/2020 | Graham | |

OTHER PUBLICATIONS

Microsoft Dynamics "Key tasks: Assign workers to projects based on availability", Oct. 2014, pp. 1-14 (Year: 2014).
Natsuko "Job and Personal Resources and Demands: The Effects on Job Satisfaction and Job Search Behavior of Certified Nursing Assistants (CNAs) Working in Nursing Homes", Apr. 2010, School of Social Work, Virginia Commonwealth University, pp. 1-166 (Year: 2010).
USPTO; U.S. Appl. No. 16/565,945; Office Action dated Dec. 30, 2020; (pp. 1-14).
USPTO; U.S. Appl. No. 16/565,945; Notice of Allowance dated Jul. 27, 2021; (pp. 1-10).

* cited by examiner

600

602 604 606 608 610 612

| | Forecasted Demand Hours for CASHIER (Regular Role) | | | | | | |
|---|---|---|---|---|---|---|---|
| | Sun | Mon | Tue | Wed | Th | Fri | Sat |
| Wk 1 | 20 | 20 | 21 | 20 | 9 | 35 | 40 |
| Wk 2 | 4 | 32 | 35 | 25 | 10 | 33 | 41 |
| Wk 3 | 12 | 24 | 29 | 22 | 15 | 35 | 35 |
| Wk 4 | 30 | 29 | 27 | 23 | 18 | 31 | 39 |
| Wk 5 | 15 | 16 | 19 | 30 | 20 | 30 | 25 |
| Wk 6 | 17 | 10 | 11 | 31 | 28 | 28 | 15 |
| Wk 7 | 22 | 30 | 19 | 32 | 31 | 27 | 45 |
| Wk 8 | 28 | 35 | 20 | 33 | 38 | 19 | 40 |
| Wk Nth | 30 | 25 | 40 | 40 | 35 | 22 | 27 |
| **Baseline Demand for Cashier** | 4 | 10 | 11 | 20 | 9 | 19 | 15 |

| Forecasted Demand Hours for STOCKER (Task Driven Role) | | | | | | | |
|---|---|---|---|---|---|---|---|
| | Sun | Mon | Tue | Wed | Th | Fri | Sat |
| Wk 1 at 0:00-0:15 | 2 | 20 | 25 | 30 | 21 | 40 | 25 |
| Wk 2 at 0:00-0:15 | 8 | 25 | 22 | 20 | 22 | 41 | 27 |
| Wk 3 at 0:00-0:15 | 9 | 21 | 24 | 20 | 23 | 42 | 29 |
| Wk 4 at 0:00-0:15 | 15 | 22 | 19 | 25 | 24 | 20 | 1 |
| Wk 5 at 0:00-0:15 | 11 | 19 | 20 | 27 | 25 | 43 | 2 |
| Wk 6 at 0:00-0:15 | 7 | 15 | 18 | 15 | 26 | 35 | 3 |
| Wk 7 at 0:00-0:15 | 6 | 16 | 19 | 19 | 27 | 35 | 4 |
| Wk 8 at 0:00-0:15 | 9 | 17 | 16 | 18 | 28 | 33 | 5 |
| Wk Nth at 0:00-0:15 | 20 | 9 | 21 | 17 | 30 | 32 | 7 |
| ***Min # of Stocker Needed between 0:00-0:15*** | 2 | 9 | 16 | 15 | 21 | 20 | 1 |
| 15min*Min # of Stocker Needed between 0:00-0:15 | 30 | 135 | 240 | 225 | 315 | 300 | 15 |
| convert to hr | 0.5 | 3 | 4 | 4 | 6 | 5 | 1 |
| ***Repeat above for the remaining 15min increment of an hour for the entire day*** | | | | | | | |
| ***sum all calculated associate hours for each 15 min increment per day*** | | | | | | | |
| **Baseline Demand for Stocker** | 20 | 80 | 6 | 9 | 15 | 30 | 60 |

LONG TERM SCHEDULING OF TASK RESOURCES AT A PLURALITY OF RETAIL STORES

CROSS-REFERENCE TO RELATED APPLICATION

This application is a continuation of U.S. application Ser. No. 16/565,945, filed Sep. 10, 2019, which claims the benefit of U.S. Provisional Application No. 62/734,847, filed Sep. 21, 2018, each of which is incorporated herein by reference in its entirety.

TECHNICAL FIELD

This invention relates generally to scheduling task resources.

BACKGROUND

Generally, scheduling of task resources at a retail store is determined weekly. As a result, a weekly work schedule of a task resource varies every week. As such, scheduling of activities not associated with the retail store is difficult to do for each task resource due to the varying weekly schedule.

BRIEF DESCRIPTION OF THE DRAWINGS

Disclosed herein are embodiments of systems, apparatuses and methods pertaining to long term scheduling of task resources. This description includes drawings, wherein:

FIG. 6 shows a simplified illustration of an exemplary process of long term scheduling of task resources in FIGS. 3-4 in accordance with some embodiments;

FIG. 7 shows a simplified illustration of an exemplary process of long term scheduling of task resources in FIG. 5 in accordance with some embodiments.

Figure 1:
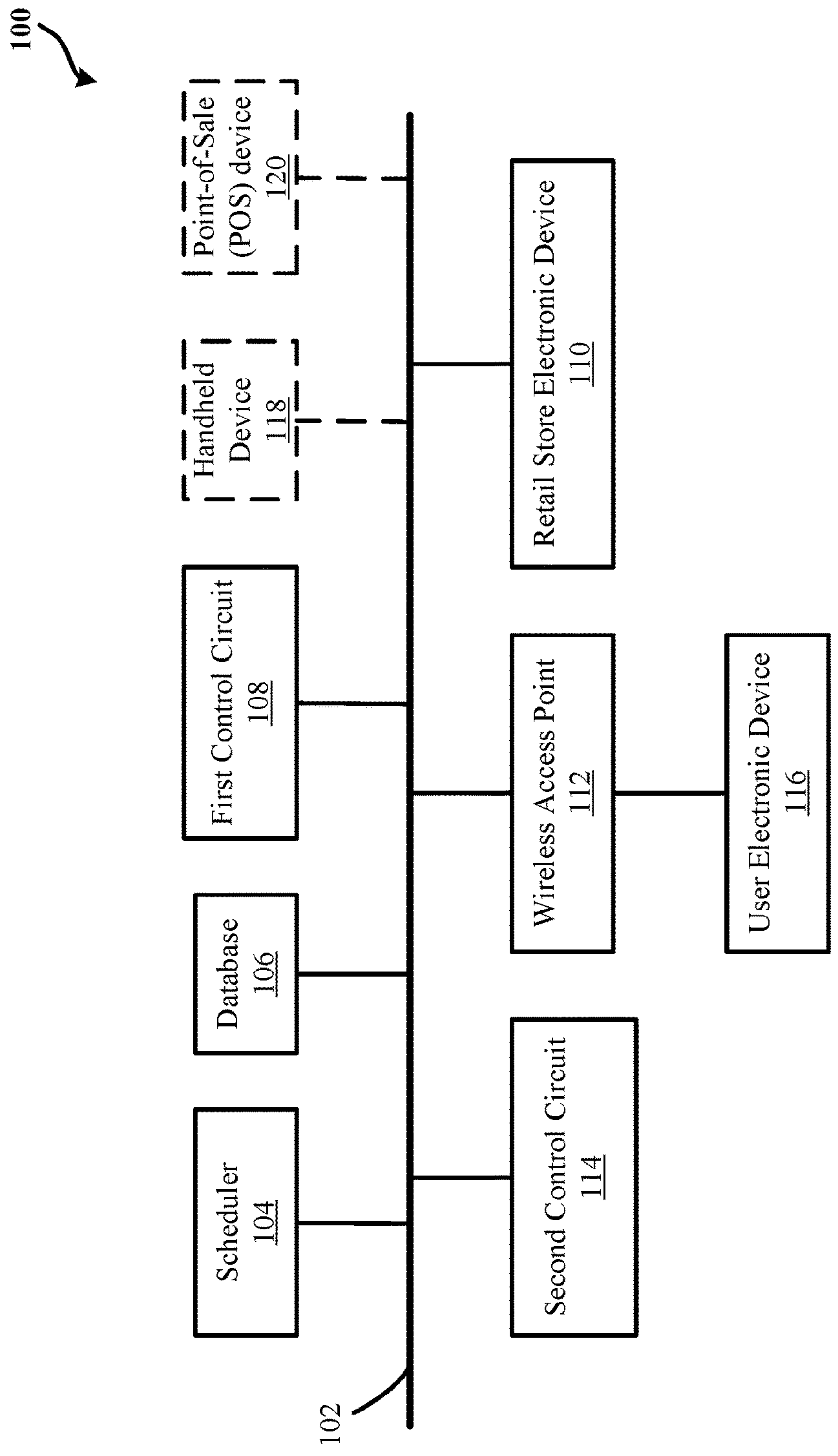
FIG. 1 is an illustration of an exemplary representation of a system for long term scheduling of task resources in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for long term scheduling of task resources at a plurality of retail stores. In some embodiments, there is provided a method to long term scheduling of task resources at a plurality of retail stores including storing, at a database, a forecasted data over at least eight weekly scheduling periods received from a remote control circuit. By one approach, the forecasted data may be associated with a plurality of retail stores and comprises a listing of a plurality of job functions, a listing of the plurality of retail stores, days in a week, and a listing of a number of task resources every 15 minute increment on each hour on each day of the week for each job function of the plurality of job functions. In one example, each store of the plurality of retail stores may be associated with first and second sets of job functions of the plurality of job functions. In one configuration, each of the set of job functions may be associated with a demand-hours-value corresponding to each day in the week. In one example, the demand-hours-value may be a number being at least 1 and representing a number of forecasted task resource hours. By one approach, the method may include first transforming, at a first control circuit, based on the forecasted data into a first baseline hours demand value for each day of the week for each job function of the first set of job functions at a particular retail store of the plurality of retail stores In some embodiments, the first transforming may include comparing corresponding demand-hours-values associated with each job function by a particular day of the week across the at least eight weekly scheduling periods. By one approach, the method may include, in response to the comparing, determining a lowest demand-hours-value associated with each job function by the particular day of the week across the at least eight weekly scheduling periods. Alternatively or in addition to, the method may include determining whether the job function corresponds to an overnight job function of the plurality of job functions. Alternatively or in addition to, the method may include, in response to the determining that the job function corresponds to the overnight job function, determining whether the lowest demand-hours-value is less than 8 hours. Alternatively or in addition to, the method may include, in response to the determining that the lowest demand-hours-value is less than 8 hours, associating the lowest demand-hours-value to the first baseline hours demand value associated with the corresponding particular day of the week for each job function at the particular retail store. Alternatively or in addition to, the method may include, in response to the determining that the lowest demand-hours-value is at least 8 hours, associating a fixed value to the first baseline hours demand value associated with the corresponding particular day of the week for each job function at the particular retail store. Alternatively or in addition to, the method may include, in response to the determining that the job function does not correspond to the overnight job function, associating the lowest demand-hours-value to the first baseline hours demand value associated with the corresponding particular day of the week for each job function at the particular retail store.

In some embodiments, the method may include second transforming, at a second control circuit, based on the forecasted data into a second baseline hours demand value for each day of the week for each job function of the second set of job functions at the particular retail store. By one approach, the second transforming may include comparing the number of task resources for every corresponding 15 minute increment on the particular day of the week for each job function over the at least eight weekly scheduling periods at the particular retail store. Alternatively or in addition to, the method may include, in response to the comparing, determining a lowest number of task resources associated with the corresponding 15 minute increment on the particular day of the week for each job function over the at least eight weekly scheduling periods at the particular retail store. Alternatively or in addition to, the method may include, in response to the determining of the lowest number of task resources associated with the corresponding 15 minutes increment on the particular day of the week for each job function over the at least eight weekly scheduling periods at the particular retail store, determining the second baseline hours demand value for each day of the week for each job function at the particular retail store based on a summation of the corresponding 15 minute increment associated with the lowest number of task resources corresponding to the particular day of the week for each job function at the particular retail store. In one configuration, the method may include, based on the first baseline hours demand value and the second baseline hours demand value, generating, by a scheduler, a plurality of fixed schedules for a set of task resources of a plurality of task resources at each of the plurality of retail stores. In one example, the fixed schedules are to remain fixed for the at least eight weekly scheduling periods to provide a fixed minimum schedule for the set of task resources. Alternatively or in addition to, the method may include, accessing, at a user electronic device associated with a first task resource of the set of task resources, a first fixed schedule of the plurality of fixed schedules associated with the first task resource. Alternatively or in addition to, the method may include, displaying, at the user electronic device, the first fixed schedule.

In some embodiments, there is a system provides long term scheduling of task resources at a plurality of retail stores including a database. By one approach, the database may store at least a forecasted data over at least eight weekly scheduling periods received from a remote control circuit. In one example, the forecasted data may be associated with a plurality of retail stores and includes a listing of a plurality of job functions, a listing of the plurality of retail stores, days in a week, and a listing of a number of task resources every 15 minute increment on each hour on each day of the week for each job function of the plurality of job functions. In one configuration, each store of the plurality of retail stores may be associated with first and second sets of job functions of the plurality of job functions. In such a configuration, each of the set of job functions may be associated with a demand-hours-value corresponding to each day in the week. In one implementation, the demand-hours-value may be a number being at least 1 and representing a number of forecasted task resource hours. In one configuration, the system may include a first control circuit communicatively coupled to the memory. By one approach, the first control circuit may initiate a first transform based on the forecasted data into a first baseline hours demand value for each day of the week for each job function of the first set of job functions at a particular retail store of the plurality of retail stores. Alternatively or in addition to, in response to the initiation of the first transformation, the first control circuit may compare corresponding demand-hours-values associated with each job function by a particular day of the week across the at least eight weekly scheduling periods. Alternatively or in addition to, in response to the comparison, the first control circuit may determine a lowest demand-hours-value associated with each job function by the particular day of the week across the at least eight weekly scheduling periods. Alternatively or in addition to, the first control circuit may determine whether the job function corresponds to an overnight job function of the plurality of job functions. By one approach, in response to the determination that the job function corresponds to the overnight job function, the first control circuit may determine whether the lowest demand-hours-value is less than 8 hours. In one configuration, in response to the determination that the lowest demand-hours-value is less than 8 hours, the first control circuit may associate the lowest demand-hours-value to the first baseline hours demand value associated with the corresponding particular day of the week for each job function at the particular retail store. In another configuration, in response to the determination that the lowest demand-hours-value is at least 8 hours, the first control circuit may associate a fixed value to the first baseline hours demand value associated with the corresponding particular day of the week for each job function at the particular retail store. By another approach, in response to the determination that the job function does not correspond to the overnight job function, the first control circuit may associate the lowest demand-hours-value to the first baseline hours demand value associated with the corresponding particular day of the week for each job function at the particular retail store.

In some embodiments, the system may include a second control circuit communicatively coupled to the memory and the first control circuit. By one approach, the second control circuit may initiate second transform based on the forecasted data into a second baseline hours demand value for each day of the week for each job function of the second set of job functions at the particular retail store. Alternatively or in addition to, in response to the initiation of the second transformation, the second control circuit may compare the number of task resources for every corresponding 15 minute increment on the particular day of the week for each job function over the at least eight weekly scheduling periods at the particular retail store. In one configuration, in response to the comparison, the second control circuit may determine a lowest number of task resources associated with the corresponding 15 minute increment on the particular day of the week for each job function over the at least eight weekly scheduling periods at the particular retail store. In such a configuration, in response to the determination of the lowest number of task resources associated with the corresponding 15 minutes increment on the particular day of the week for each job function over the at least eight weekly scheduling periods at the particular retail store, the second control circuit may determine the second baseline hours demand value for each day of the week for each job function at the particular retail store based on a summation of the corresponding 15 minute increment associated with the lowest number of task resources corresponding to the particular day of the week for each job function at the particular retail store.

Alternatively or in addition to, the system may include a scheduler communicatively coupled to the first control circuit and the second control circuit. By one approach, the scheduler may generate a plurality of fixed schedules for a set of task resources of a plurality of task resources at each of the plurality of retail stores based on the first baseline hours demand value and the second baseline hours demand value. For example, the fixed schedules may remain fixed for the at least eight weekly scheduling periods to provide a fixed minimum schedule for the set of task resources. Alternatively or in addition to, the system may include a wireless access point associated with the particular retail store. In some implementation, a user electronic device may communicatively couple to the scheduler via the wireless access point. For example, the user electronic device may access a first fixed schedule of the plurality of fixed schedules associated with a first task resource of the set of task resources and display the first fixed schedule.

To illustrate, reference will now be made simultaneously to FIGS. 1-8. FIG. 1 is an illustration of an exemplary representation of a system 100 for long term scheduling of task resources in accordance with some embodiments. The system 100 includes a database 106, a first control circuit 108, and a second control circuit 114 communicatively coupled via a communication bus 102. By one approach, the database 106 may be stored in a memory including one or more storage devices (e.g., hard disk, flash drives, portable hard drives, cloud storage, solid stage drives, and the like), a random access memory (RAM), a read only memory (ROM), and/or the like. In one configuration, the memory may be proximate and in communication with the first control circuit 108 and/or the second control circuit 114 via the communication bus 102 internal to a communication server. In another configuration, the memory may be remote from and in communication with the first control circuit 108 and/or the second control circuit 114 via the communication bus 102, such Internet, wired and/or wireless network, and/or the like. By one approach, the first control circuit 108 and/or the second control circuit 114 may be part of a distributed processing architecture using one or more computers, processors, and/or microprocessors to run one or more applications. By another approach, the first control circuit 108 and/or the second control circuit 114 may be part of virtual processing architecture sharing a plurality of processors and/or microprocessors running a plurality of separate, independent applications. In one configuration, the system 100 may include a scheduler 104 communicatively coupled with the first control circuit 108 and/or the second control circuit 114 via the communication bus 102. In one example, the scheduler 104 may include another control circuit part of the distributed processing architecture or the virtual processing architecture described above. In yet another example, the first control circuit 108, the second control circuit 114, the scheduler 104, or any combination thereof may include processors, microprocessors, servers, computers not part of the distributed processing architecture or the virtual processing architecture described above. In yet another example, the first control circuit 108, the second control circuit 114, the scheduler 104, may include applications and/or software stored in one or more memories and executed by one or more processors. In one scenario, the one or more memories may include one or more storage devices (e.g., hard disk, flash drives, portable hard drives, cloud storage, solid stage drives, and the like), a random access memory (RAM), a read only memory (ROM), and/or the like.

In some embodiments, the system 100 may include a wireless access point 112. By one approach, the wireless access point 112 may include a router, a gateway, a switch, and/or any devices capable of enabling a plurality of electronic devices to connect to and communicate with other electronic devices connected within a communication network associated with a particular retail store. For example, the plurality of electronic devices and/or the other electronic devices may include one or more user electronic devices 116 associated with a user inside and/or in close proximity of the particular retail store. In one scenario, the user electronic devices 116 may include a smartphone and/or any electronic devices owned and/or controlled by the user). Alternatively or in addition to, the plurality of electronic devices and/or the other electronic devices may include one or more retail store electronic devices 110 (e.g., kiosk, laptop, tablet, and/or any electronic devices owned and/or controlled by the particular retail store).

By one approach, the components described in the system 100 of FIG. 1 are functioning cooperatively to provide long term scheduling of task resources at a plurality of retail stores. As such, the database 106, the first control circuit 108, the communication bus 102, the second control circuit 114, and the scheduler 104 are cooperatively configured to provide a customized fixed schedule to each task resource of a particular job function (may also be referred to as role) associated with each retail store of the plurality of retail stores. In one example, each task resource of a particular job function may have the same customized fixed schedule, where each task resource may further individually customize the fixed schedule based on additional availability. By one approach, the task resource may include fixed crowd sourced resources, employee resources, and contracted third party resources (e.g., shipping company employees, inventory scanners, to name a few) etc. Each task resource of a plurality of task resources at a retail store having a fixed schedule for a period of time, (e.g., at least eight weekly scheduling periods) is an improvement over the current industry norm of having varied weekly schedule for each task resource. As such, at least one benefit of providing each task resource a fixed work schedule is the ability to schedule activities outside and/or not associated with activities of the retail store (e.g., personal activities, personal appointment, and/or the like). Thus, providing a better work life balance for the plurality of task resources at the retail store. To illustrate, FIGS. 2-8 are described below.

Figure 2:
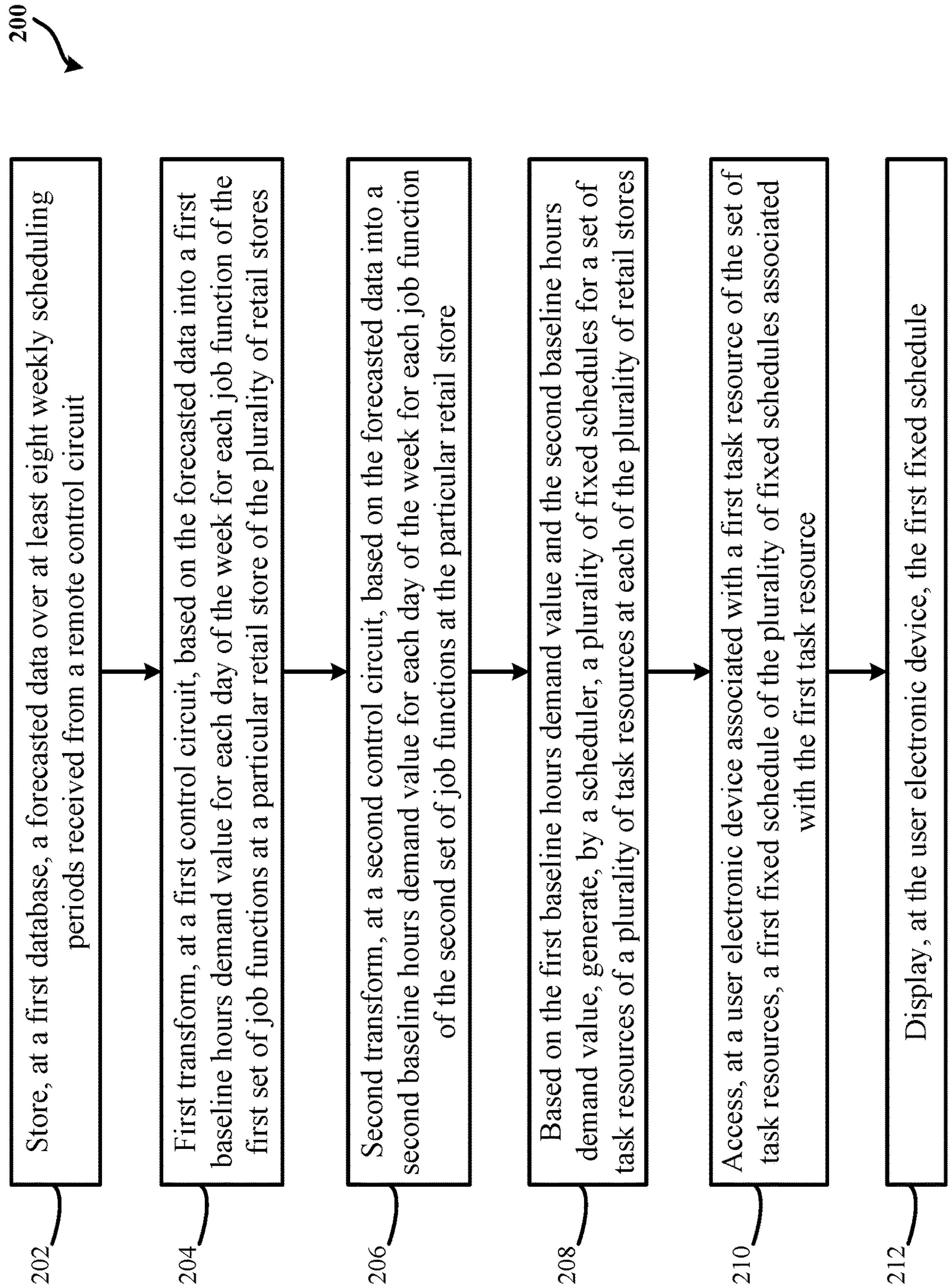
FIG. 2 shows a flow diagram of an exemplary process of long term scheduling of task resources in accordance with some embodiments.
Figure 3:
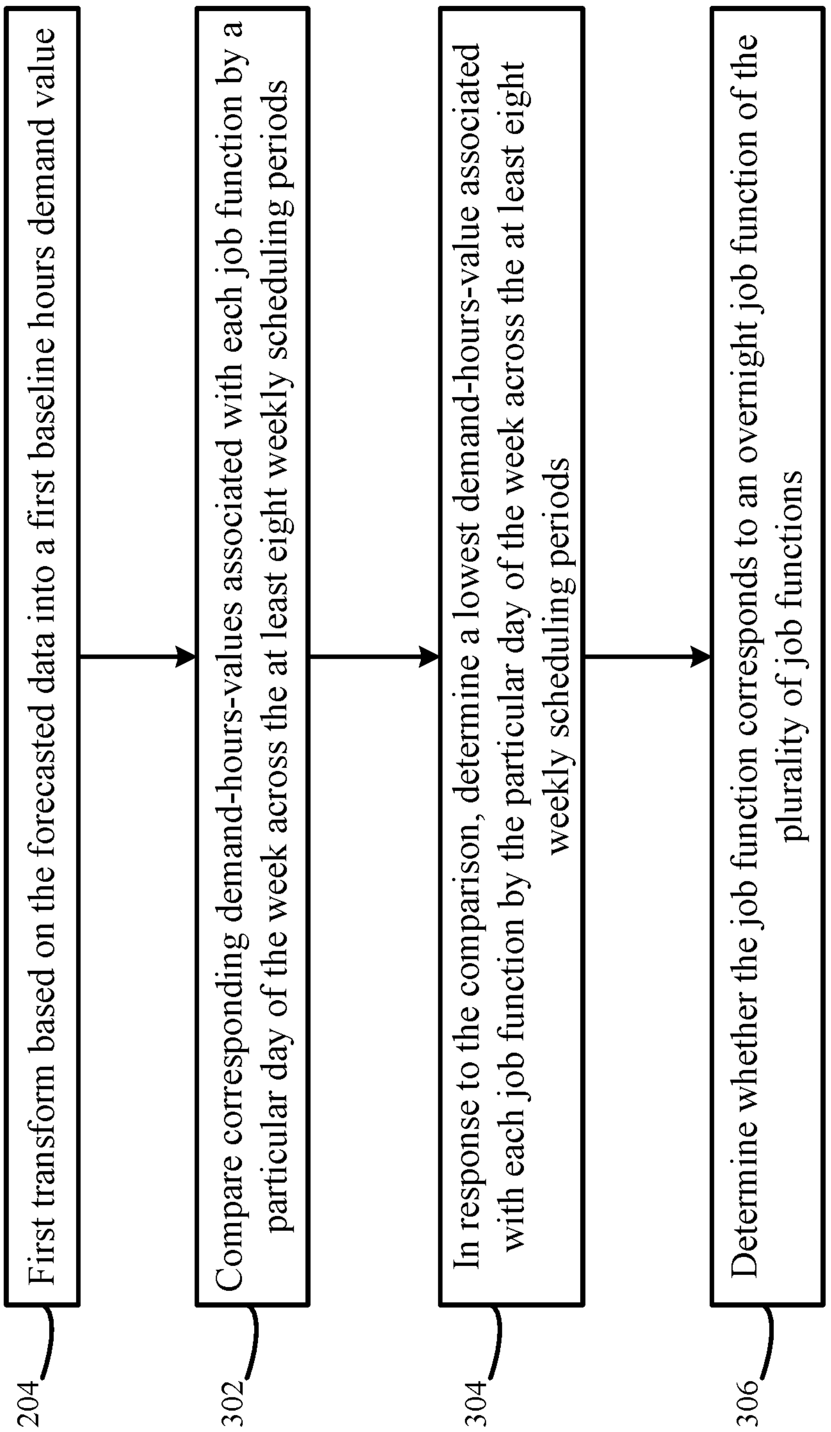
FIGS. 3-4 show a flow diagram of an exemplary process of long term scheduling of task resources in accordance with some embodiments.
Figure 4:
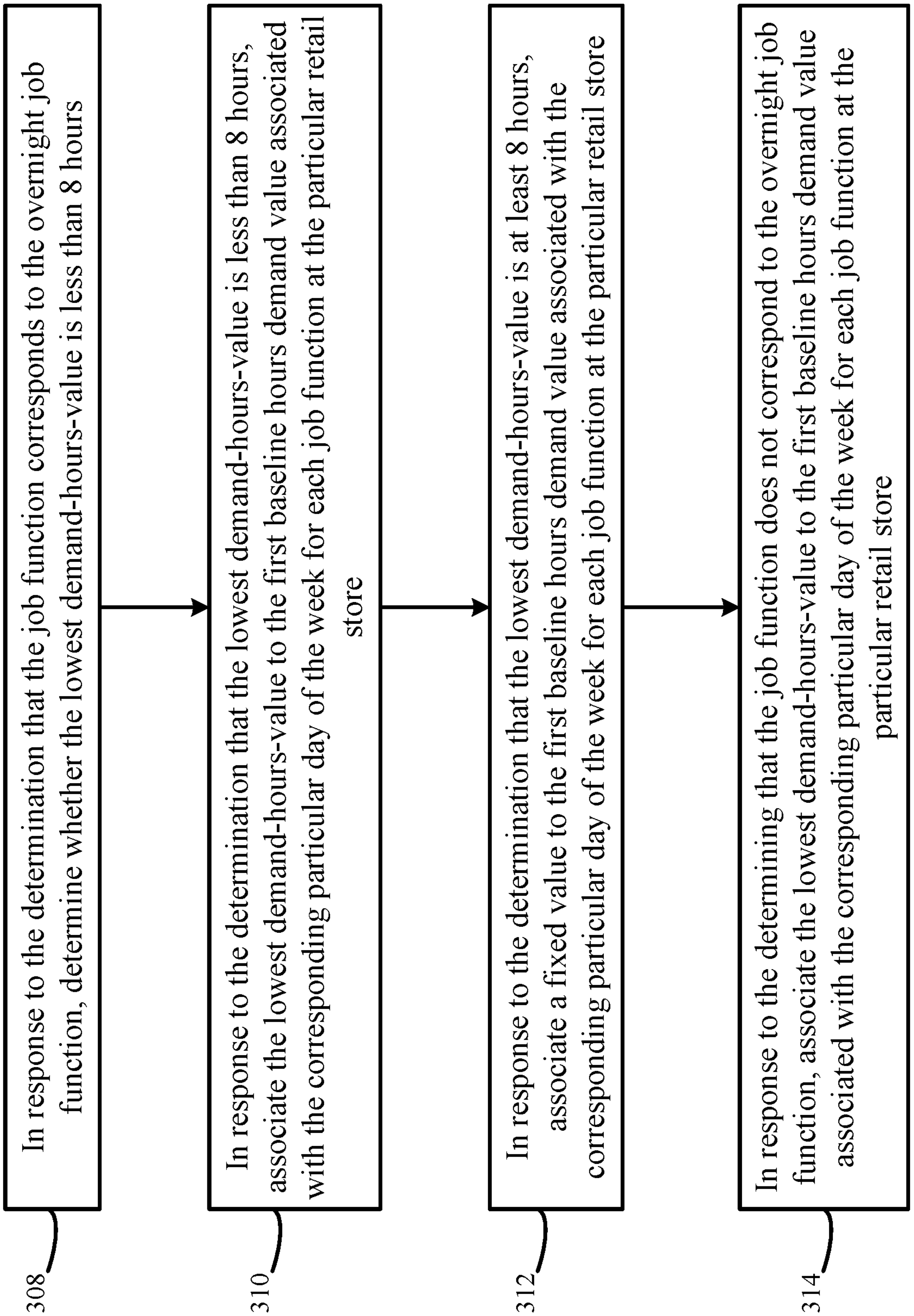
Figure 5:
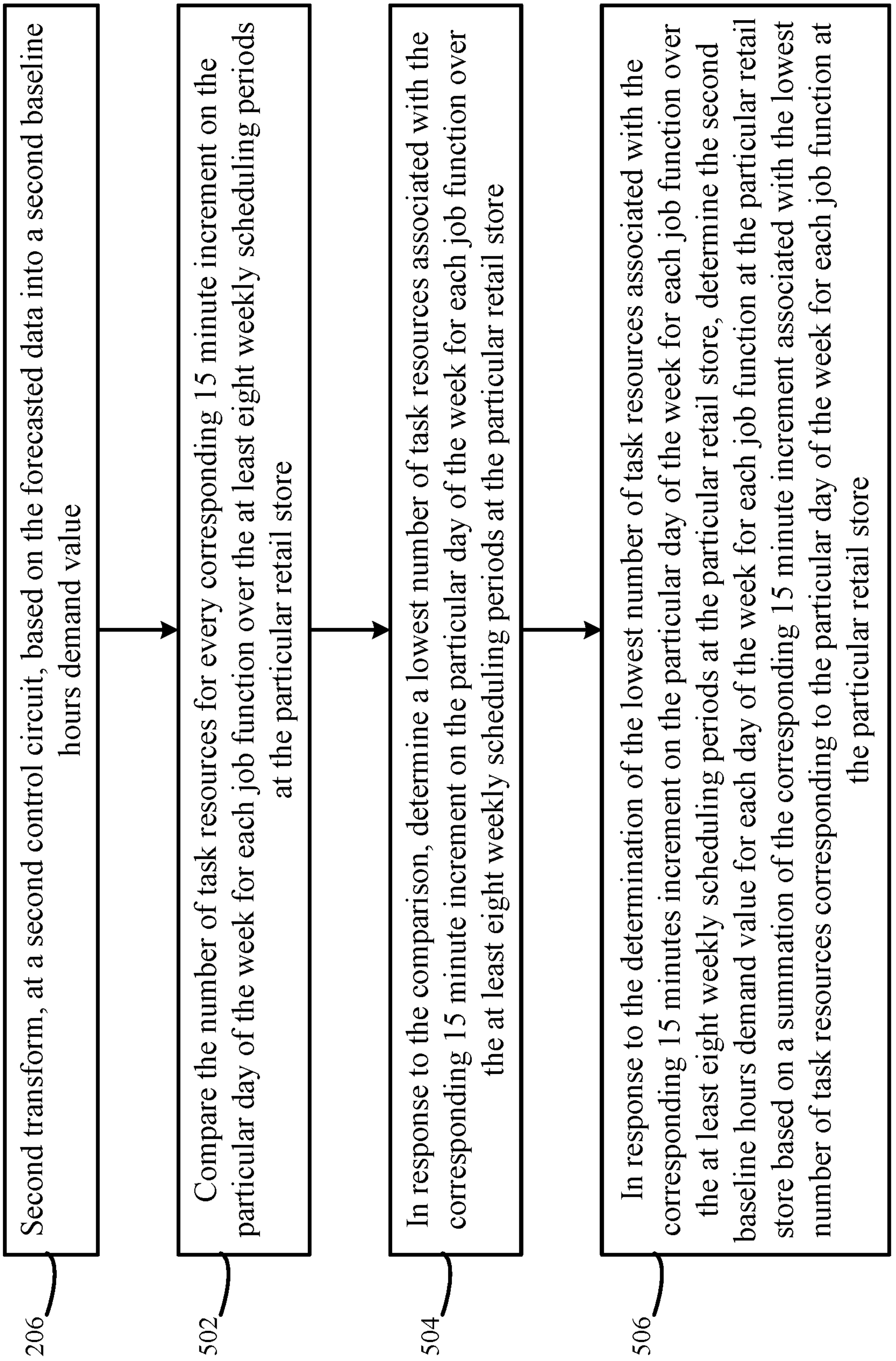
FIG. 5 shows a flow diagram of an exemplary process of long term scheduling of task resources in accordance with some embodiments.

FIG. 2 shows a flow diagram of an exemplary process (method 200) of long term scheduling of task resources in accordance with some embodiments. FIGS. 3-4 show a flow diagram of an exemplary process of long term scheduling of task resources in accordance with some embodiments. Particularly, FIGS. 3-4 show a flow diagram of transforming a forecasted data into a first baseline hours demand value of FIG. 2. To clarify, FIG. 6 shows a simplified illustration of an exemplary process of long term scheduling of task resources in FIGS. 3-4 in accordance with some embodiments. FIG. 5 shows a flow diagram of an exemplary process of long term scheduling of task resources in accordance with some embodiments. Particularly, FIG. 5 show a flow diagram of transforming a forecasted data into a second baseline hours demand value of FIG. 2. To clarify, FIG. 7 shows a simplified illustration of an exemplary process of long term scheduling of task resources in FIG. 5 in accordance with some embodiments.

By one approach, the method 200 may be implemented in the system 100 of FIG. 1. For example, the database 106 may store a forecasted data over at least eight weekly scheduling periods received from a remote control circuit, at step 202. In one configuration, the remote control circuit may be part of the distributed processing architecture or the virtual processing architecture described above. In another configuration, the forecasted data may include data used to estimate and/or predict demand hours and/or resources needed for each retail store over a period of time (e.g., four weeks, eight weeks, twelve weeks, sixteen weeks, etc.) based on past and present data associated with operating one or more retail stores. By one approach, the forecasted data may be associated with a plurality of retail stores and includes a listing of a plurality of job functions/roles, a listing of the plurality of retail stores, days in a week, and/or a listing of a number of task resources every 15 minute increment on each hour on each day of the week for each job function of the plurality of job functions. As described herein, the 15 minute increment may be substituted with other incremental value that is a portion of an hour. In one scenario, the incremental value may range from 10 to 30 minutes. In one example, each store of the plurality of retail stores may be associated with first and second sets of job functions of the plurality of job functions. In such an example, each of the set of job functions may be associated with a demand-hours-value corresponding to each day in the week. By one approach, the demand-hours-value may be a number being at least 1 and representing a number of forecasted task resource hours.

In some embodiments, a first transforming may be executed at the first control circuit 108 based on the forecasted data into a first baseline hours demand value for each day of the week for each job function of a first set of job functions at a particular retail store of the plurality of retail stores, at step 204. By one approach, the first set of job functions may include job functions or job roles associated with customer traffic driven job functions at a retail store. For example, the customer traffic driven job functions may include cashier, front-end supervisors, shopping cart attendants, baggers, and customer service associates. In one implementation, the method 200 may include, at step 302, comparing corresponding demand-hours-values associated with each job function by a particular day of the week across the at least eight weekly scheduling periods. In an illustrative non-limiting example, table 600 is shown in FIG. 1. Table 600 shows a forecasted demand hours for a job function of cashier 602. Table 600 includes days of the week (e.g., Sunday through Saturday), a weekly scheduling period 608 starting from week 1 (Wk. 1) through week Nth, and a baseline demand for cashier 610. By one approach, the forecasted data stored in the database 106 may include a plurality of forecasted demand hours for a plurality of job functions for each retail store. As such, the same forecasted data or copies of the same forecasted is used to determine baseline demand for each day of the week per job function of another retail store. In one scenario, each element shown in FIG. 6 of the table 600 may be individually and/or separately indexed in the database 106. In another scenario, the forecasted data may be formatted into a plurality of tables for each job function. In an illustrative example, Sunday 604 includes a plurality of demand-hours-values for the job function of cashier. Each Sunday 604 of a week in the weekly scheduling period 608 is associated with a corresponding one of the plurality of demand-hours-values (e.g., 20, 4, 12, 30, 15, etc. as shown in FIG. 6 under the column for Sunday 604). In one implementation, the first control circuit 108 may, for Sunday 604, compare a demand-hours-value of Wk. 1 with another demand-hours-value of Wk. 2. By one approach, the first control circuit 108 may repeatedly compare each demand-hours-value associated with Sunday 604 until the demand-hours-value of Wk. Nth is compared. In such an approach, the first control circuit 108 may, at step 304, determine a lowest demand-hours-value associated with each job function by the particular day of the week across the at least eight weekly scheduling periods in response to the comparison. Continuing the illustrative non-limiting example shown in FIG. 6, in response to the comparison, the first control circuit 108 may determine that the lowest demand-hours-value 612 for the Sunday 604 for the job function of cashier is the demand-hours-value of four (4) 606. In some embodiments, the first baseline hours demand value for each day of the week for each job function of the first set of job functions at a particular retail store may be determined by repeating steps 302 and 304 for each day of the week.

In some embodiments, additional steps 306 through 314 are executed by the first control circuit 108 to determine the lowest demand-hours-value associated with each job function. For example, the first control circuit 108 may determine whether the job function corresponds to an overnight job function of the plurality of job functions, at step 306. By one approach, the overnight job function may correspond to a job function normally associated with having a work schedule at night and/or a job function best performed at night due to light customer traffic. In one configuration, in response to the determination that the job function corresponds to the overnight job function, determining by the first control circuit 108 whether the lowest demand-hours-value is less than 8 hours, at step 308. In some implementation, the 8 hours may be substituted with other predetermined threshold value between 1 to 24 hours. In one example, the other predetermined threshold value may range between 8 to 12 hours. Alternatively or in addition to, the first control circuit 108 may associate, at step 310, the lowest demand-hours-value to the first baseline hours demand value associated with the corresponding particular day of the week for each job function at the particular retail store in response to the determination that the lowest demand-hours-value is less than 8 hours. By another approach, in response to the determination that the lowest demand-hours-value is at least 8 hours, associating, by the first control circuit 108, a fixed value to the first baseline hours demand value associated with the corresponding particular day of the week for each job function at the particular retail store, at step 312. Alternatively or in addition to, the first control circuit 108 may associate, at step 314, the lowest demand-hours-value to the first baseline hours demand value associated with the corresponding particular day of the week for each job function at the particular retail store in response to the determination that the job function does not correspond to the overnight job function. By one approach, the forecasted data stored in the database 106 may indicate which job functions corresponds to an overnight job function. By another approach, the database 106 may store association of which job functions correspond to an overnight job function and/or a regular job function that is customer traffic driven, and/or a task driven job function.

In some embodiments, the method 200 may include a second transforming, at the second control circuit 114, based on the forecasted data into a second baseline hours demand value for each day of the week for each job function of a second set of job functions at a particular retail store, at step 206. By one approach, the second set of job functions may correspond to job functions that are task driven as opposed to customer traffic driven. For example, the task driven job functions may include a stocker, a deli associate, a bakery associate, a meat associate, a maintenance associate, etc. In such an example, the task driven job functions may correspond to job functions that may be needed at a retail store regardless of an amount of customer traffic at the retail store at any given time. In an illustrative non-limiting example, table 700 is shown in FIG. 7 to illustrate the step 206 of FIG. 2. Table 700 shows a forecasted demand hours for a job function of stocker 702. Table 700 includes days of the week (e.g., Sunday through Saturday), a weekly scheduling period 708 starting from week 1 (Wk. 1) at 0:00 hour to 0:15 hour through week Nth at 0:00 hour to 0:15 hour, and a baseline demand for stocker 720. For ease of illustration, table 700 of FIG. 7 is shown as a partial table that only shows a number of task resources demanded for a 15 minute increment between 0:00 hour to 0:15 hour on each day of the week for the job function of stocker over the weekly scheduling period 708 at a particular retail store. A complete table 700 may include a number of task resources demanded for each 15 minute increment on a twenty-four (24) hour day for each job function over the weekly scheduling period 708 at the particular retail store. By one approach, the forecasted data stored in the database 106 may include a number of task resources for every corresponding 15 minute increment for a plurality of job functions for each retail store. As such, the same forecasted data or copies of the same forecasted is used to determine baseline demand for each day of the week per job function of another retail store. In one scenario, one or more elements shown in FIG. 7 of the table 700 may be individually and/or separately indexed in the database 106. In another scenario, the forecasted data may be formatted into a plurality of tables for each job function.

In one configuration, the second control circuit 114 may comparing, at step 502, the number of task resources for every corresponding 15 minute increment on the particular day of the week for each job function over the at least eight weekly scheduling periods at the particular retail store. Alternatively or in addition to, in response to the comparison at step 502, the second control circuit 114 may determine, at step 504, a lowest number of task resources associated with a corresponding 15 minute increment on a particular day of the week for each job function over at least eight weekly scheduling periods at a particular retail store. As an illustrative non-limiting example, on Sunday 704 of FIG. 7, the second control circuit 114 may compare each number of task resources associated with the 15 minute increment between 0:00 hour to 0:15 hour. In response to the comparison, the second control circuit 114 may determine a lowest number of task resources associated with the 15 minute increment between 0:00 hour to 0:15 hour on the Sunday 704 for the job function of stocker over the weekly scheduling period 708 at the particular retail store. As such, the second control circuit 114 may determine that the lowest number of task resources between 0:00 hour to 0:15 hour on Sunday 704 is the task resource value of two (2) 706. Alternatively or in addition to, in response to the determination of the lowest number of task resources associated with the corresponding 15 minutes increment on the particular day of the week for each job function over the at least eight weekly scheduling periods at the particular retail store, the second control circuit 114 may determine, at step 506, the second baseline hours demand value for each day of the week for each job function at the particular retail store based on a summation of the corresponding 15 minute increment associated with the lowest number of task resources corresponding to the particular day of the week for each job function at the particular retail store.

Continuing the illustrative non-limiting example above, table 700 of FIG. 7 includes a number of steps (e.g., 712, 714, 716, and 718) that may be executed by the second control circuit 114 to arrive at the second baseline hours demand value for a stocker job function 720 after the determination of the lowest number of task resources 710 for every corresponding 15 minutes increment on Sunday 704, for example. In one scenario, in response to the determination of the task resource value 706, the task resource value 706 is multiplied by 15 minutes to arrive at the number of resources in unit of minutes needed between 0:00 hour to 0:15 hour on Sunday 704, at step 712. At step 714, the number of resources in the unit of minutes is converted to the number of resources in unit of hour. At step 716, the second control circuit 114 may repeat the steps 710, 712, and 714 for each remaining 15 minute increment between 0:15 hour through 24:00 hour of Sunday 704. At step 718, the second control circuit 114 may sum all the determined number of resources in unit of hour for Sunday 704 and arrive at the second baseline hours demand value for Sunday 704, at step 722, for example. In one implementation, steps 710, 712, 714, and 718 may be executed the second control circuit 114 for each of the remaining days of the week to determine the remaining second baseline hours demand value corresponding to each remaining day of the week. Note that the numbers indicated in the step 720 of FIG. 7 are for illustrative purposes only. By one approach, one or more of the steps 712, 714, and 716 are one of a number of possible steps that the second control circuit 114 may execute to arrive at step 506 of FIG. 5.

In some embodiments, the method 200 may include, at step 208, based on the first baseline hours demand value and the second baseline hours demand value, generating, by the scheduler 104, a plurality of fixed schedules for a set of task resources of a plurality of task resources at each of the plurality of retail stores. By one approach, the fixed schedules are to remain fixed for the at least eight weekly scheduling periods to provide a fixed minimum schedule for the set of task resources. In one configuration, in addition to the first baseline hours demand value and the second baseline hours demand value, the scheduler 104 may generate the plurality of fixed schedules for the set of task resources based on a job configuration associated with each of the plurality of job functions at each retail store. In one example, the job configuration may comprise a listing of job functions and an association for each job function with a work schedule time range for each day of the week. By one approach, the scheduler 104 may use the work schedule time range for each job function and the first baseline hours demand value and/or the second baseline hours demand value to determine the fixed schedule for each task resource associated with the corresponding job function. In an illustrative non-limiting example, the job configuration for a cashier on a Sunday may include a start time of 7:00 am through 8:00 am and the corresponding first baseline hours demand value associated with Sunday is 4 hours, as such, the scheduler 104 may output a fixed work schedule of an hour between 7:00 am through 8:00 am for a four task resources each having a job function of a cashier. Alternatively or in addition to, the method 200 may include, at step 210, accessing, at the user electronic device 116 associated with a first task resource of the set of task resources, a first fixed schedule of the plurality of fixed schedules associated with the first task resource. Alternatively or in addition to, the method 200 may include, at step 212, displaying, at the user electronic device 116, the first fixed schedule. In an illustrative non-limiting example, a particular task resource may access the database 106 via the wireless access point 112 to display, at the user electronic device 116 a fixed work schedule associated with the particular task resource. By one approach, the particular task resource may modify, via the user electronic device 116, the fixed work schedule to add additional work schedule desired by the particular task resource. In another approach, the particular task resource may provide one or more inputs via the user electronic device 116 to modify and/or decline the fixed work schedule. Alternatively or in addition to, the method 200 may include automatically notifying, by the first control circuit 108, the second control circuit 114, and/or other control circuit, the user electronic device 116 at a time the user electronic device 116 is communicatively coupled to the wireless access point 112 that a fixed work schedule is available for the particular task resource to accept, decline, and/or modify. Alternatively or in addition to, the particular task resource may access the fixed work schedule via the retail store electronic device 110.

In some embodiments, the scheduler 104 may modify the first fixed schedule to include the additional schedule associated with the particular task resource. By one approach, the database 106 may store additional schedules of a plurality of additional schedules associated with the task resources. In one configuration, the scheduler 104 may generate a final fixed schedule including the first fixed schedule and the additional schedule. In one example, the additional schedules may be based on prior inputs by the task resources. In such example, each additional schedule corresponds to additional days and/or times a corresponding task resource would to like work in addition to the first fixed schedule.

Figure 8:
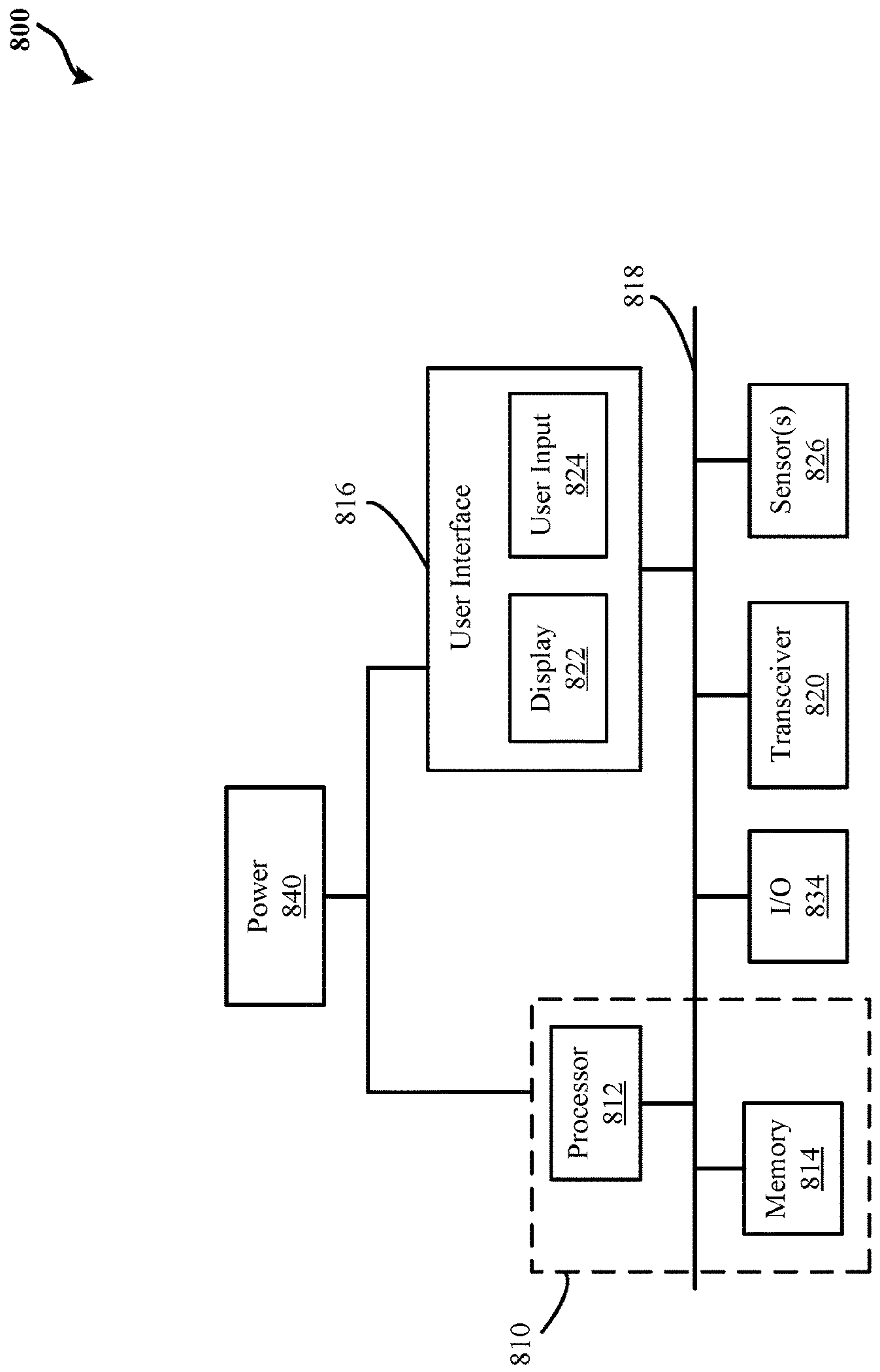
FIG. 8 illustrates an exemplary system for use in implementing methods, techniques, devices, apparatuses, systems, servers, sources and providing long term scheduling of task resources at a plurality of retail stores, in accordance with some embodiments.

Further, the circuits, circuitry, systems, devices, processes, methods, techniques, functionality, services, sources and the like described herein may be utilized, implemented and/or run on many different types of devices and/or systems. FIG. 8 illustrates an exemplary system 800 that may be used for implementing any of the components, circuits, circuitry, systems, functionality, apparatuses, processes, or devices of the system 100 of FIG. 1 and/or other above or below mentioned systems or devices, or parts of such circuits, circuitry, functionality, systems, apparatuses, processes, or devices. For example, the system 800 may be used to implement some or all of the database 106, the first control circuit 108, the communication bus 102, the second control circuit 114, the scheduler 104, the wireless access point 112, the user electronic device 116, the retail store electronic device 110, and/or other such components, circuitry, functionality and/or devices. However, the use of the system 800 or any portion thereof is certainly not required.

By way of example, the system 800 may comprise a control circuit or processor module 812, memory 814, and one or more communication links, paths, buses or the like 818. Some embodiments may include one or more user interfaces 816, and/or one or more internal and/or external power sources or supplies 840. The control circuit 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 812 can be part of control circuitry and/or a control system 810, which may be implemented through one or more processors with access to one or more memory 814 that can store instructions, code and the like that is implemented by the control circuit and/or processors to implement intended functionality. In some applications, the control circuit and/or memory may be access over and/or distributed over a communications network (e.g., LAN, WAN, Internet) providing distributed and/or redundant processing and functionality.

The user interface 816 can allow a user to interact with the system 800 and receive information through the system. In some instances, the user interface 816 includes a display 822 and/or one or more user inputs 824, such as buttons, touch screen, track ball, keyboard, mouse, etc., which can be part of or wired or wirelessly coupled with the system 800. Typically, the system 800 further includes one or more communication interfaces, ports, transceivers 820 and the like allowing the system 800 to communicate over a communication bus, a distributed computer and/or communication network 618 (e.g., a local area network (LAN), the Internet, wide area network (WAN), etc.), communication link 618, other networks or communication channels with other devices and/or other such communications or combination of two or more of such communication methods. Further the transceiver 820 can be configured for wired, wireless, optical, fiber optical cable, satellite, or other such communication configurations or combinations of two or more of such communications. Some embodiments include one or more input/output (I/O) ports 834 that allow one or more devices to couple with the system 800. The I/O ports can be substantially any relevant port or combinations of ports, such as but not limited to USB, Ethernet, or other such ports. The I/O interface 834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 826. The sensors can include substantially any relevant sensor, such as acoustic or sound sensors, temperature sensors, rain sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 800 comprises an example of a control and/or processor-based system with the control circuit 812. Again, the control circuit 812 can be implemented through one or more processors, controllers, central processing units, logic, software and the like. Further, in some implementations the control circuit 812 may provide multiprocessor functionality.

The memory 814, which can be accessed by the control circuit 812, typically includes one or more processor readable and/or computer readable media accessed by at least the control circuit 812, and can include volatile and/or nonvolatile media, such as RAM, ROM, EEPROM, flash memory and/or other memory technology. Further, the memory 814 is shown as internal to the control system 810; however, the memory 814 can be internal, external or a combination of internal and external memory. Similarly, some or all of the memory 814 can be internal, external or a combination of internal and external memory of the control circuit 812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 814 can store code, software, executables, scripts, data, patterns, thresholds, lists, programs, log or history data, and the like. While FIG. 8 illustrates the various components being coupled together via a bus, it is understood that the various components may actually be coupled to the control circuit and/or one or more other components directly.

In some embodiments, the first baseline hours demand value and/or the second baseline hours demand value may be adjusted at a second time after the plurality of fixed schedules are generated at a first time. By one approach, the adjustment may be executed by the first control circuit 108, the second control circuit 114, and/or other control circuits to calibrate the first baseline hours demand value and/or the second baseline hours demand value based on a most recent customer traffic at the particular retail store. In one example, a handheld device 118 of FIG. 1 may be used by a retail associate to address product questions by customers regarding one or more products at the particular retail store. In one scenario, the customer may ask the retail associate the number of inventories available for a first product. In response, the retail associate may scan an identifier associated with the first product using the handheld device 118 to determine the number of inventories remaining for the first product. Thus, throughout the day and/or for an entire period (e.g., a week, two weeks, and/or any other predetermined number of weeks), the handheld device 118 may be used to address questions by customers and record the number of times scans are made for the entire period. As such, the first control circuit 108, the second control circuit 114, and/or the other control circuits may access the number of times scans are made by the handheld device 118 for the entire period and correlate the number of scans with an amount of sale purchases at a Point-of-Sale (POS) device 120. Subsequently, the first control circuit 108, the second control circuit 114, and/or the other control circuits may increment the first baseline hours demand value and/or the second baseline hours demand value and determine after a passing of another entire period whether the current correlation of the number of times scans are made using the handheld device 118 with the amount of sale purchases at the POS device 120 during the another entire period is within a predefined threshold relationship between the number of scans and the amount of sale purchases. By one approach, when the number of scans and the amount of sale purchases is not within the predefined threshold relationship, the first baseline hours demand value and/or the second baseline hours demand value may be incremented until the predefined threshold relationship is reached at a subsequent determination of the first control circuit 108, the second control circuit 114, and/or the other control circuits. By another approach, when the number of scans and the amount of sale purchases is within the predefined threshold relationship, the first control circuit 108, the second control circuit 114, and/or the other control circuits may stop incrementing the first baseline hours demand value and/or the second baseline hours demand value. As described herein, other devices other than the handheld device 118 and the POS device 120 may be correlated to determine whether one or more associative functions and/or operations of the other devices may be within one or more predefined threshold relationships. By one approach, the predefined threshold relationships may include a predefined ratio, a predefined percentage relative relationship of correlated devices (e.g., the handheld device 118, the POS device 120, the other devices, among other devices that may be used to determine whether additional task resources are needed after implementing the first fixed schedule at a retail store). For example, at least one of the first control circuit 108 and the second control circuit 114 may track a number of times a scan is made by the handheld device 118 during a time period within the at least eight weekly scheduling periods. Alternatively or in addition to, at least one of the first control circuit 108 and the second control circuit 114 may determine an amount of sale purchases processed at the point-of-sale device during the time period and/or determine whether the number of times the scan is made and the amount of sale purchases processed is within a predefined threshold relationship. By one approach, being within the predefined threshold relationship may indicate that at least one of the first baseline hours demand value and the second baseline hours demand value does not need adjustment.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for long term scheduling of task resources at a plurality of retail stores comprising:

storing, at a database, forecasted data over at least eight weekly scheduling periods, wherein the forecasted data is associated with the plurality of retail stores and comprises a listing of a plurality of job functions, a listing of the plurality of retail stores, days in a week, and a listing of a number of task resources every first time period increment on each day of the week for each job function of the plurality of job functions, wherein each of the plurality of job functions is associated with a demand-hours-value corresponding to each day in the week, and wherein the demand-hours-value is a number being at least 1 and representing a number of forecasted task resource hours;

determining, at a first control circuit and based on the forecasted data, a first baseline hours demand value for each day of the week for each job function of a first set of job functions at a particular retail store of the plurality of retail stores;

determining, at a second control circuit and based on the forecasted data, a second baseline hours demand value for each day of the week for each job function of a second set of job functions at the particular retail store;

automatically generating, by a scheduler and based on the first baseline hours demand value and the second baseline hours demand value, a plurality of fixed schedules for a set of task resources of a plurality of task resources at each of the plurality of retail stores, wherein the plurality of fixed schedules are to remain fixed for the at least eight weekly scheduling periods to provide a fixed minimum schedule for the set of task resources;

automatically instructing, by at least one of the first control circuit or the second control circuit, a user electronic device associated with a first task resource of the set of task resources to display a notification indicating that a first fixed schedule of the plurality of fixed schedules associated with the first task resource is available;

accessing, at the user electronic device, the first fixed schedule; and displaying, at the user electronic device, the first fixed schedule.

2. The method of claim 1, wherein the plurality of job functions comprises at least two of a cashier, a stocker, a deli associate, a bakery associate, a meat associate, a maintenance associate, a front-end supervisor, and a bagger.

3. The method of claim 1, wherein the plurality of job functions comprises the first set of job functions associated with customer traffic driven job functions at the particular retail store and the second set of job functions associated with task driven job functions at the particular retail store.

4. The method of claim 1, wherein the task resources comprise one or more task resources that are one or more of crowd sourced, employee, and contracted third party.

5. The method of claim 1, wherein weekly scheduling periods comprise at least one of eight, twelve, and sixteen weeks.

6. The method of claim 1, further comprising:

scanning, by a handheld device communicatively coupled to at least one of the first control circuit and the second control circuit, a plurality of identifiers of a plurality of products for sale at the particular retail store, wherein each of the plurality of identifiers is associated with information particular to one of the plurality of products;

tracking, by the at least one of the first control circuit and the second control circuit, a number of times a scan is made by the handheld device during a time period within the at least eight weekly scheduling periods;

determining, by the at least one of the first control circuit and the second control circuit, an amount of sale purchases processed at a point-of-sale device during the time period, wherein the point-of-sale device processes products sold at the particular retail store;

determining, by the at least one of the first control circuit and the second control circuit, whether the number of times the scan is made and the amount of sale purchases processed is within a predefined threshold relationship, wherein being within the predefined threshold relationship indicates that at least one of the first baseline hours demand value and the second baseline hours demand value does not need adjustment; and in response to a determination that the number of times the scan is made and an amount of sales processed is not within the predefined threshold relationship, incrementing, by the at least one of the first control circuit and the second control circuit, the at least one of the first baseline hours demand value and the second baseline hours demand value.

7. The method of claim 1, wherein determining of the first baseline hours demand value comprises:

comparing corresponding demand-hours-values associated with each job function by a particular day of the week across the at least eight weekly scheduling periods;

in response to the comparing, determining a lowest demand-hours-value associated with each job function by the particular day of the week across the at least eight weekly scheduling periods;

determining whether the job function corresponds to an overnight job function of the plurality of job functions;

in response to a determination the determining that the job function corresponds to the overnight job function, determining whether the lowest demand-hours-value is less than 8 hours;

in response to a determination that the lowest demand-hours-value is less than 8 hours, associating the lowest demand-hours-value to the first baseline hours demand value associated with the corresponding particular day of the week for each job function at the particular retail store;

in response to a determination that the lowest demand-hours-value is at least 8 hours, associating a fixed value to the first baseline hours demand value associated with a corresponding particular day of the week for each job function at the particular retail store; and in response to a determination that the job function does not correspond to the overnight job function, associating the lowest demand-hours-value to the first baseline hours demand value associated with the corresponding particular day of the week for each job function at the particular retail store.

8. The method of claim 7, wherein determining of the second baseline hours demand value comprises:

comparing the number of task resources for every corresponding first time period increment on the particular day of the week for each job function over the at least eight weekly scheduling periods at the particular retail store;

in response to the comparing, determining a lowest number of task resources associated with the corresponding first time period increment on the particular day of the week for each job function over the at least eight weekly scheduling periods at the particular retail store; and in response to the determining of the lowest number of task resources associated with the corresponding first time period increment on the particular day of the week for each job function over the at least eight weekly scheduling periods at the particular retail store, determining the second baseline hours demand value for each day of the week for each job function at the particular retail store based on a summation of the corresponding first time period increment associated with the lowest number of task resources corresponding to the particular day of the week for each job function at the particular retail store.

9. A system that provides long term scheduling of task resources at a plurality of retail stores comprising:

a database storing at least a forecasted data over at least eight weekly scheduling periods, wherein the forecasted data is associated with the plurality of retail stores and comprises a listing of a plurality of job functions, a listing of the plurality of retail stores, days in a week, and a listing of a number of task resources every first time period on each day of the week for each job function of the plurality of job functions, wherein each of the plurality of job functions is associated with a demand-hours-value corresponding to each day in the week, and wherein the demand-hours-value is a number being at least 1 and representing a number of forecasted task resource hours;

a first control circuit communicatively coupled to a memory, the first control circuit configured to:

determine based on the forecasted data a first baseline hours demand value for each day of the week for each job function of a first set of job functions at a particular retail store of the plurality of retail stores;

a second control circuit communicatively coupled to the memory and the first control circuit, the second control circuit configured to:

determine based on the forecasted data into a second baseline hours demand value for each day of the week for each job function of a second set of job functions at the particular retail store;

a scheduler communicatively coupled to the first control circuit and the second control circuit, the scheduler configured to automatically generate a plurality of fixed schedules for a set of task resources of a plurality of task resources at each of the plurality of retail stores based on the first baseline hours demand value and the second baseline hours demand value, wherein the plurality of fixed schedules are to remain fixed for the at least eight weekly scheduling periods to provide a fixed minimum schedule for the set of task resources; and an access point associated with the particular retail store and coupled to the scheduler, the access point configured to:

receive an instruction from at least one of the first control circuit or the second control circuit causing a user electronic device associated with a first task resource of the set of task resources to automatically display a notification indicating that a first fixed schedule of the plurality of fixed schedules associated with the first task resource is available; and provide access to the first fixed schedule via the user electronic device.

10. The system of claim 9, wherein the determination of the first baseline hours demand value comprises:

compare corresponding demand-hours-values associated with each job function by a particular day of the week across the at least eight weekly scheduling periods;

in response to the comparison, determine a lowest demand-hours-value associated with each job function by the particular day of the week across the at least eight weekly scheduling periods;

determine whether the job function corresponds to an overnight job function of the plurality of job functions;

in response to the determination that the job function corresponds to the overnight job function, determine whether the lowest demand-hours-value is less than 8 hours;

in response to the determination that the lowest demand-hours-value is less than 8 hours, associate the lowest demand-hours-value to the first baseline hours demand value associated with a corresponding particular day of the week for each job function at the particular retail store;

in response to the determination that the lowest demand-hours-value is at least 8 hours, associate a fixed value to the first baseline hours demand value associated with the corresponding particular day of the week for each job function at the particular retail store; and in response to the determination that the job function does not correspond to the overnight job function, associate the lowest demand-hours-value to the first baseline hours demand value associated with the corresponding particular day of the week for each job function at the particular retail store.

11. The system of claim 10, wherein the determination of the second baseline hours demand value comprises:

compare the number of task resources for every corresponding first time period increment on the particular day of the week for each job function over the at least eight weekly scheduling periods at the particular retail store;

in response to the comparison, determine a lowest number of task resources associated with the corresponding first time period increment on the particular day of the week for each job function over the at least eight weekly scheduling periods at the particular retail store; and in response to the determination of the lowest number of task resources associated with the corresponding first time period increment on the particular day of the week for each job function over the at least eight weekly scheduling periods at the particular retail store, determine the second baseline hours demand value for each day of the week for each job function at the particular retail store based on a summation of the corresponding first time period increment associated with the lowest number of task resources corresponding to the particular day of the week for each job function at the particular retail store.

12. The system of claim 9, wherein the plurality of job functions comprises at least two of a cashier, a stocker, a deli associate, a bakery associate, a meat associate, a maintenance associate, a front-end supervisor, and a bagger.

13. The system of claim 9, wherein the plurality of job functions comprises a first set of job functions associated with customer traffic driven job functions at the particular retail store and a second set of job functions associated with task driven job functions at the particular store.

14. The system of claim 9, wherein the task resources comprise one or more task resources that are one or more of crowd sourced, employee, and contracted third party.

15. The system of claim 9, wherein weekly scheduling periods comprise at least one of eight, twelve, and sixteen weeks.

16. The system of claim 9, wherein the scheduler is further configured to modify the first fixed schedule to include additional schedule stored in the database; and generate a final fixed schedule, wherein the final fixed schedule comprises the first fixed schedule and the additional schedule, and wherein the additional schedule is based on a prior input by corresponding task resource associated with the first fixed schedule.

17. The system of claim 9, further comprising:

a handheld device communicatively coupled to at least one of the first control circuit and the second control circuit, the handheld device configured to scan a plurality of identifiers of a plurality of products for sale at the particular retail store, wherein each of the plurality of identifiers is associated with information particular to one of the plurality of products; and a point-of-sale device communicatively coupled to the at least one of the first control circuit and the second control circuit and configured to process products sold at the particular retail store, wherein the at least one of the first control circuit and the second control circuit is further configured to:

track a number of times a scan is made by the handheld device during a time period within the at least eight weekly scheduling periods;

determine an amount of sale purchases processed at the point-of-sale device during the time period;

determine whether the number of times the scan is made and the amount of sale purchases processed is within a predefined threshold relationship, wherein being within the predefined threshold relationship indicates that at least one of the first baseline hours demand value and the second baseline hours demand value does not need adjustment; and in response to the determination that the number of times the scan is made and an amount of sales processed is not within the predefined threshold relationship, increment the at least one of the first baseline hours demand value and the second baseline hours demand value.

18. A method for long term scheduling of task resources at a plurality of retail stores comprising:

storing, at a database, a forecasted data over at least eight weekly scheduling periods received from a remote control circuit, wherein the forecasted data is associated with a plurality of retail stores and comprises a listing of a plurality of job functions, a listing of the plurality of retail stores, days in a week, and a listing of a number of task resources on a predefined period increment on a predefined period on each day of the week for each job function of the plurality of job functions, wherein each store of the plurality of retail stores is associated with first and second sets of job functions of the plurality of job functions, wherein each of the set of job functions is associated with a demand-hours-value corresponding to each day in the week, and wherein the demand-hours-value is a number being at least 1 and representing a number of forecasted task resource hours;

first transforming, at a first control circuit, based on the forecasted data into a first baseline hours demand value for each day of the week for each job function of a first set of job functions at a particular retail store of the plurality of retail stores, wherein the first transforming comprises:

comparing corresponding demand-hours-values associated with each job function by a particular day of the week across the at least eight weekly scheduling periods;

in response to the comparing, determining a lowest demand-hours-value associated with each job function by the particular day of the week across the at least eight weekly scheduling periods;

determining whether the job function corresponds to an overnight job function of the plurality of job functions;

in response to the determining that the job function corresponds to the overnight job function, determining whether the lowest demand-hours-value is less than a predefined duration;

in response to the determining that the lowest demand-hours-value is less than the predefined duration, associating the lowest demand-hours-value to the first baseline hours demand value associated with a corresponding particular day of the week for each job function at the particular retail store;

in response to the determining that the lowest demand-hours-value is at least the predefined duration, associating a fixed value to the first baseline hours demand value associated with the corresponding particular day of the week for each job function at the particular retail store; and in response to the determining that the job function does not correspond to the overnight job function, associating the lowest demand-hours-value to the first baseline hours demand value associated with the corresponding particular day of the week for each job function at the particular retail store;

second transforming, at a second control circuit, based on the forecasted data into a second baseline hours demand value for each day of the week for each job function of a second set of job functions at the particular retail store, wherein the second transforming comprises:

comparing the number of task resources for every corresponding predefined period increment on the particular day of the week for each job function over the at least eight weekly scheduling periods at the particular retail store;

in response to the comparing, determining a lowest number of task resources associated with the corresponding predefined period increment on the particular day of the week for each job function over the at least eight weekly scheduling periods at the particular retail store; and in response to the determining of the lowest number of task resources associated with the corresponding predefined period increment on the particular day of the week for each job function over the at least eight weekly scheduling periods at the particular retail store, determining the second baseline hours demand value for each day of the week for each job function at the particular retail store based on a summation of the corresponding predefined period increment associated with the lowest number of task resources corresponding to the particular day of the week for each job function at the particular retail store;

based on the first baseline hours demand value and the second baseline hours demand value, automatically generating, by a scheduler, a plurality of fixed schedules for a set of task resources of a plurality of task resources at each of the plurality of retail stores, wherein the plurality of fixed schedules are to remain fixed for the at least eight weekly scheduling periods to provide a fixed minimum schedule for the set of task resources;

automatically instructing, by at least one of the first control circuit or the second control circuit, a user electronic device associated with a first task resource of the set of task resources to display a notification indicating that a first fixed schedule of the plurality of fixed schedules associated with the first task resource is available;

accessing, at the user electronic device, the first fixed schedule; and displaying, at the user electronic device, the first fixed schedule.

19. The method of claim 18, wherein the plurality of job functions comprises at least two of a cashier, a stocker, a deli associate, a bakery associate, a meat associate, a maintenance associate, a front-end supervisor, and a bagger.

20. The method of claim 18, wherein the first set of job functions is associated with customer traffic driven job functions at the particular retail store, and wherein the second set of job functions is associated with task driven job functions at the particular store.

* * * * *